June 9, 1925.
J. T. TERRY
PROCESS OF TREATING ORES
Filed Oct. 29, 1924
1,541,292
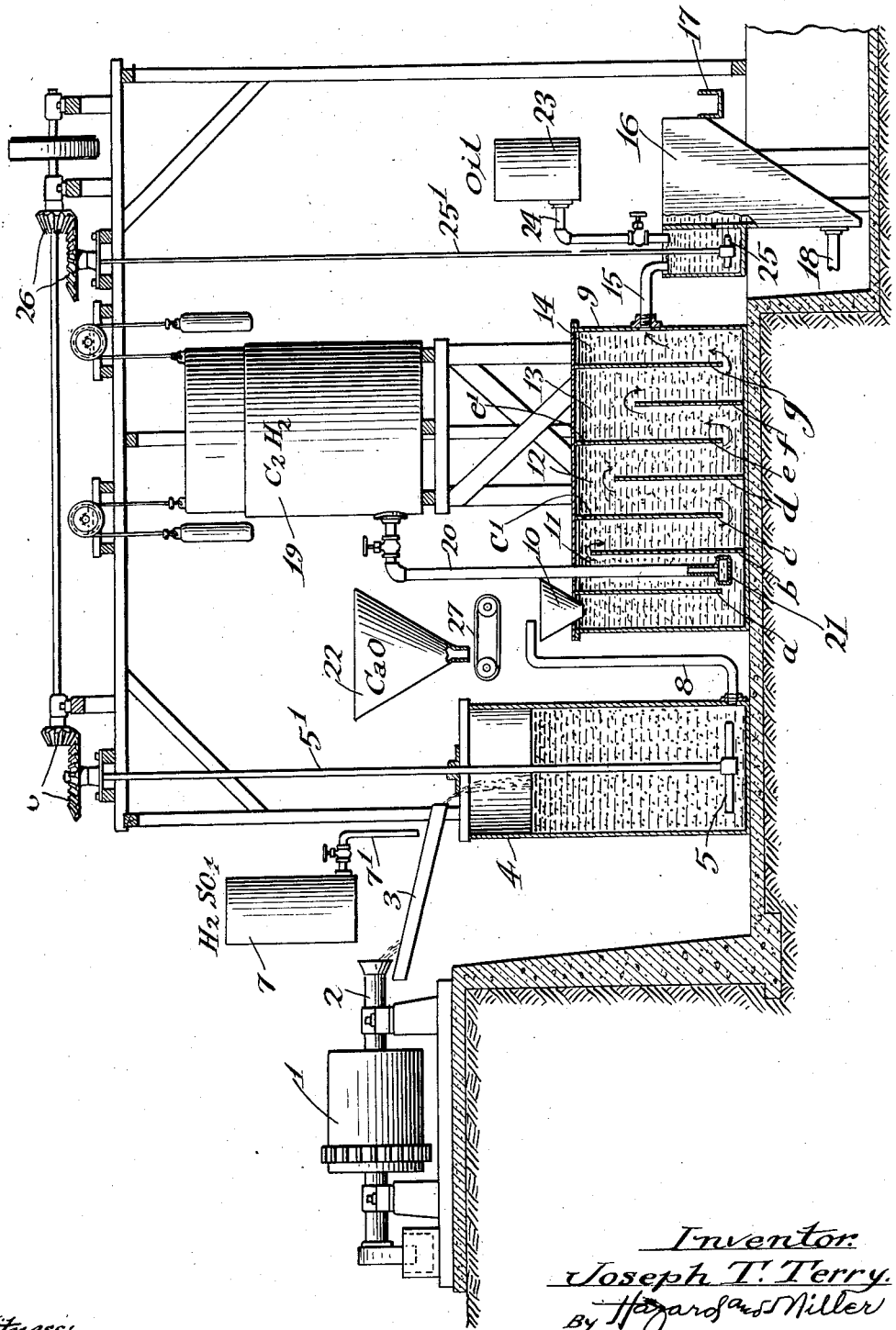

Patented June 9, 1925.

1,541,292

UNITED STATES PATENT OFFICE.

JOSEPH T. TERRY, OF ALHAMBRA, CALIFORNIA, ASSIGNOR OF ONE-HALF TO JAMES E. LACY AND ONE-EIGHTH TO RICHARD H. LACY, BOTH OF LOS ANGELES, CALIFORNIA.

PROCESS OF TREATING ORES.

Application filed October 29, 1924. Serial No. 746,525.

*To all whom it may concern:*

Be it known that I, JOSEPH T. TERRY, a citizen of the United States, residing at Alhambra, in the county of Los Angeles and State of California, have invented new and useful Improvements in Processes of Treating Ores, of which the following is a specification.

My invention relates to a process of treating ores, and especially ores containing copper other than copper sulphide, such as copper carbonate, with or without other metals.

It is an object of this invention to provide a simple, efficient and economical method or process of recovering copper from ores, making use of acetylene to convert the copper and silver, if any silver be present, to acetylene derivatives, and subjecting the mass to a flotation process to recover a concentrate.

My invention consists in the steps of the process hereinafter described and claimed.

In the accompanying drawing I have shown diagrammatically an apparatus suitable for carrying out my process.

Referring to the drawings, 1 represents a ball mill suitable for crushing the ore, having a discharge outlet 2 through which a finely ground pulp may be discharged to a trough or launder 3 for conveyance to an agitation tank 4, provided with a suitable stirrer 5, mounted on a vertical shaft $5^1$ and driven by gears 6 from any suitable source of power.

An acid container 7 provided with a valve controlled pipe $7^1$ supplies acid to the pulp in trough 3. A discharge pipe 8 leads from the tank 4 to a closed rectangular reaction tank 9 provided with a receiving funnel 10 and a series of staggered baffles $a$, $b$, $c$, $d$, $e$, $f$, and $g$, so arranged that the flowing pulp travels in a downward and upward course through the chambers 11, 12, 13 and 14. Alternate baffles $b$, $d$, and $f$, are of diminishing height to cause a difference in hydrostatic head and to facilitate the flow of the pulp through the reaction tank 9. A discharge outlet 15 leads from reaction tank 9 to a standard type of flotation cell 16, provided with a concentrate overflow take-off 17, and a residue discharge outlet 18. Disposed above the flotation cell 16 is a container 23 provided with a discharge pipe 24 for feeding a suitable flotation reagent into the pulp entering the flotation cell. 25 is a stirrer mechanism on a vertical shaft $25^1$ operated by gears 26.

An acetylene gas generator 19 is provided to supply acetylene to chamber 11 of the tank 9 by means of a valve controlled pipe 20, terminating in a nozzle 21 near the bottom of chamber 11 between the baffles $a$ and $b$. A calcined lime container 22 supplies calcium oxide by means of a conveyer 27 to the funnel 10.

In carrying out my process for example, ore containing copper or copper and silver, with or without other metals such as iron, is put into the ball mill 1, where it is ground to a suitable pulp in the presence of water. When ground to the proper degree it is discharged through outlet 2 into launder 3 and mixed with sulphuric acid from container 7 and delivered to agitation tank 4, in which the ore particles are maintained in a constant state of suspension assuring intimate contact of all of the metalliferous particles with the solvent. The pulp containing dissolved copper and possibly other metals in solution is discharged from tank 4 into funnel 10 leading to reaction tank 9. Here calcium oxide is added from the container 22 in sufficient amount to render the pulp slightly alkaline, thereby causing precipitation of metals in solution as hydroxides, in accordance with the following equation:

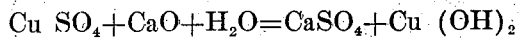
$$Cu\ SO_4 + CaO + H_2O = CaSO_4 + Cu(OH)_2$$

In the reaction tank 9 the copper hydroxide suspended in the ore pulp comes in contact, during its passage, with acetylene supplied from the acetylene generator 19 through the nozzle 21. The baffles $c$ and $e$ are provided at their upper ends with openings $c^1$ and $e^1$, permitting the acetylene gas to pass from chamber 11 to chambers 12 and 13. A chemical reaction takes place as follows:

$$2\ Cu(OH)_2 + C_2H_2 = C_2H_2(CuO)_2 + 2H_2O$$

This reaction may be complete or partial, in fact, only a superficial filming is necessary for the success of my process.

From the reaction tank 9 the pulp passes through pipe 15 to flotation cell 16 where it receives an addition of a suitable reagent such as a mixture of wood creosote and cresylic acid supplied from container 23. The pulp is subjected to flotation treatment well known to those skilled in the art, and a concentrate is recovered as a froth overflow at 17 while the tailings residues pass out through discharge opening 18.

In place of calcium oxide, calcium carbonate or alkali metal carbonate or sponge iron may be used.

The process is based on my discovery that metal acetylene compounds, such as copper acetylide and silver acetylide, have an affinity for suitable oils and for flotation reagents. Also on the observation that copper, silver and mercury compounds in precipitated form, other than sulphides, are rapidly transformed to acetylene derivatives by contact with acetylene and rendered susceptible to flotation concentration. When copper is precipitated from sulphuric acid solutions with sponge iron complete removal of copper is not attained, due to resolution of copper by iron salts produced in chemical reaction.

As a corollary or subsidiary to my main process, I may treat the residue or the original pulp by suitable method of concentration as gravity treatment, flotation before or after the solution of copper to recover the naturally occurring metal sulphides susceptible to such recovery.

It will be understood by those skilled in the art that various changes in the construction of the apparatus and in the steps of the process may be made without departing from the spirit of my invention, as claimed.

I claim:

1. A process of treating metalliferous ores, comprising subjecting the ground ore to the action of a solvent of metals, precipitating dissolved metals in the pulp as insoluble compounds other than sulphides, treating the pulp with acetylene to form metal acetylide at least in part, and separating by the flotation process a concentrate containing metal acetylides.

2. A process of treating copper ore, comprising subjecting the ground ore to the action of a solvent of copper, precipitating the copper as an insoluble compound in the pulp other than sulphide, treating the pulp with acetylene to form copper acetylide at least in part, and separating by the flotation process a concentrate containing copper acetylides.

3. A process of treating metalliferous ores, comprising subjecting ground and roasted ore to the action of a solvent, precipitating dissolved metals in the pulp as insoluble compounds other than sulphides, treating the pulp with acetylene to form metal acetylide at least in part, and separating by the flotation process a concentrate containing metal acetylides.

4. A process of treating copper ore, comprising subjecting the ground copper ore to the action of sulphuric acid forming copper sulphate, adding calcium hydroxide to precipitate the copper in the form of hydroxide in the pulp, treating the pulp with acetylene to form copper acetylide at least in part, and recovering a copper concentrate by the flotation process.

In testimony whereof I have signed my name to this specification.

J. T. TERRY.